June 14, 1960 H. A. R. DE MIRANDA 2,941,095
COUPLING CIRCUIT ARRANGEMENT
Filed Sept. 19, 1957
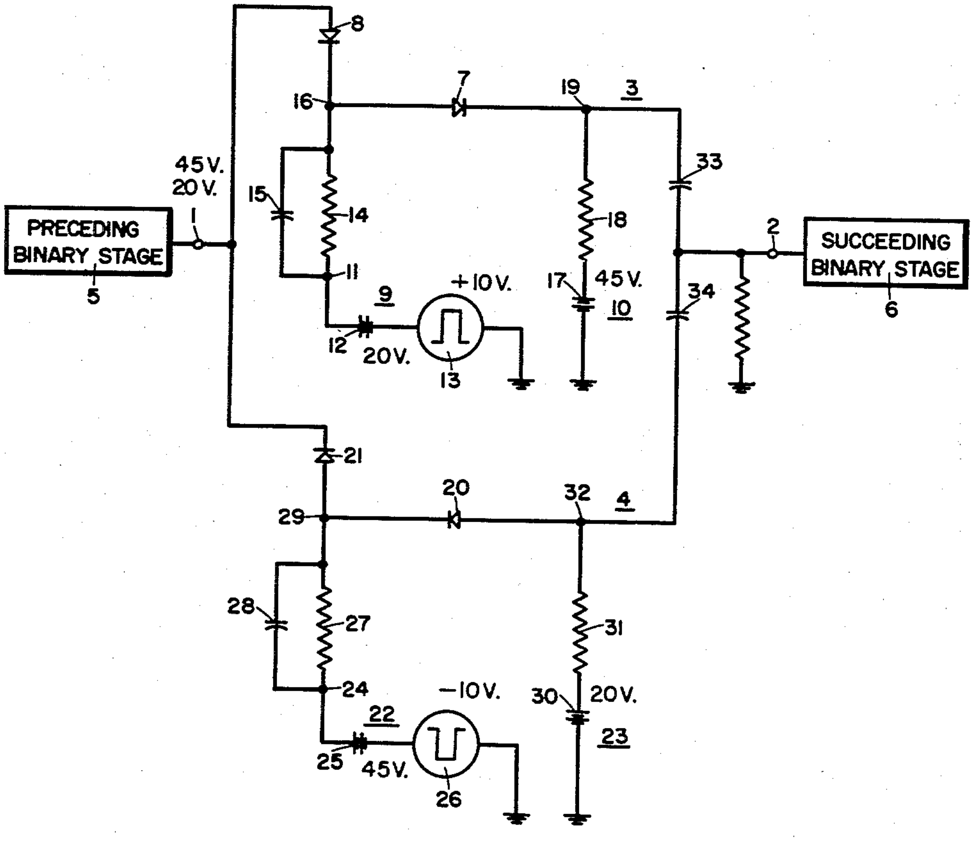
INVENTOR.
HEINE ANDRIES RODRIGUES DE MIRANDA
BY
Frank R. Jifari
Agent

United States Patent Office 2,941,095

Patented June 14, 1960

2,941,095

COUPLING CIRCUIT ARRANGEMENT

Heine Andries Rodrigues De Miranda, Levittown, N.Y., assignor to North American Philips Company Inc., New York, N.Y., a corporation of Delaware Filed Sept. 19, 1957, Ser. No. 684,972

6 Claims. (Cl. 307—88.5)

The present invention relates to a coupling circuit. More particularly, the invention relates to a coupling circuit for the binary stages of a shift register.

The coupling circuit of the present invention has a single input terminal and a single output terminal, so that it is especially suitable for coupling a preceding binary stage having a single output terminal to a succeeding binary stage having a single input terminal. A binary stage having a single input terminal and a single output terminal and which may be efficiently coupled to a similar binary stage by the coupling circuit of the present invention is shown in a copending United States patent application, Serial No. 658,104, filed May 9, 1957.

An object of the present invention is to provide a coupling circuit of relatively simple structure and of relatively great efficiency of operation.

This and other objects of the invention are realized by the coupling circuit of the present invention.

In accordance with the present invention, the coupling circuit comprises a first circuit branch adapted to conduct current in a positive direction from the input to the output upon the simultaneous occurrence of an input voltage of a first predetermined level of magnitude and a periodically occurring positive shift pulse thereby to produce a positive output pulse, and a second circuit branch adapted to conduct current in a negative direction from the input to the output upon the simultaneous occurrence of an input pulse of a second predetermined level of magnitude and a periodically occurring negative shift pulse thereby to produce a negative output pulse.

More particularly, when a preceding binary stage is On it produces an output signal having a first level of magnitude and when it is Off it produces an output signal having a second level of magnitude. The output signal is applied to the input terminal of the coupling circuit which produces a positive output pulse at its output terminal when the preceding stage is On and a negative output pulse when the preceding stage is Off.

The invention will be described in greater detail with reference to the accompanying drawing, wherein the single figure is a schematic diagram of an embodiment of the circuit arrangement of the present invention.

In the figure, an input terminal 1 is coupled to an output terminal 2 through a first circuit branch 3 and a second circuit branch 4. The first and second circuit branches 3 and 4 are in parallel relation between the input terminal 1 and the output terminal 2. The coupling network couples a preceding binary stage 5 to a succeeding binary stage 6.

The first circuit branch 3 comprises a first unidirectionally conducting element 7 and a first auxiliary unidirectionally conducting element 8 connected in series circuit arrangement between the input and output terminals 1 and 2. The first branch 3 further comprises first biasing means 9 and second biasing means 10 for the first unidirectionally conducting element 7. The first biasing means 9 comprises a terminal 11 to which a primary biasing voltage of substantially constant magnitude from a voltage source 12 is applied and a secondary biasing voltage from a source of positive shift pulses 13 is applied. The source of positive shift pulses 13 may be any source of periodically occurring shift pulses, of suitable length, suitable for use in a binary system. The primary biasing voltage is preferably a positive direct voltage of substantially constant magnitude level and the secondary biasing voltage is a periodically occurring shift voltage of preferably rectilinear positive pulse waveform. The primary and secondary biasing voltages are algebraically added or combined to form a first resultant biasing voltage. The first resultant biasing voltage is applied to the anode of the first unidirectionally conducting element 7 through a first RC circuit having a resistor 14 and a capacitor 15 to a point 16 between the first auxiliary unidirectionally conducting element 8 and the first unidirectionally conducting element 7. The second biasing means 10 comprises a source 17 of tertiary biasing voltage of substantially constant magnitude. The tertiary biasing voltage is preferably a positive direct voltage of substantially constant magnitude level and is applied to the cathode of the first unidirectionally conducting element 7 through a resistor 18 to a point 19 between the first unidirectionally conducting element 7 and the output terminal 2.

The second circuit branch 4 comprises a second unidirectionally conducting element 20 and a second auxiliary unidirectionally conducting element 21 connected in series circuit arrangement bewteen the input and output terminals 1 and 2. The second circuit branch 4 further comprises first biasing means 22 and second biasing means 23 for the second unidirectionally conducting element 20. The first biasing means 22 comprises a terminal 24 to which a primary biasing voltage of substantially constant magnitude from a voltage source 25 is applied and a secondary biasing voltage from a source of negative shift pulses 26 is applied. The source of negative shift pulses 26 may be any source of periodically occurring shift pulses, of suitable length, suitable for use in a binary system. The primary biasing voltage is preferably a positive direct voltage of substantially constant magnitude level and the secondary biasing voltage is a periodically occurring shift voltage of preferably rectilinear negative pulse waveform. The primary and secondary biasing voltages are algebraically added or combined to form a second resultant biasing voltage. The second resultant biasing voltage is applied to the cathode of the second unidirectionally conducting element 20 through a second RC circuit having a resistor 27 and a capacitor 28 to a point 29 between the second auxiliary unidirectionally conducting element 21 and the second unidirectionally conducting element 20. The second biasing means 23 comprises a source 30 of tertiary biasing voltage of substantially constant magnitude. The tertiary biasing voltage is preferably a positive direct voltage of substantially constant magnitude level and is applied to the anode of the second unidirectionally conducting element 20 through a resistor 31 to a point 32 between the second unidirectionally conducting element 20 and the output terminal 2. Capacitors 33 and 34 are coupling capacitors which take up the difference in D.C. level in the circuit branches 3 and 4.

When the preceding binary stage 5 is On it produces an output signal which is applied to the input terminal 1 as an input voltage. This signal has a (first) level of magnitude of, for example, 45 volts. When the preceding binary stage 5 is Off it produces an output signal which is applied to the input terminal 1 as an input voltage. The last-mentioned signal has a (second) level of magnitude of, for example, 20 volts. In this case, a primary positive biasing voltage of 20 volts is applied to the terminal 11 by the voltage source 12, a tertiary positive biasing voltage of 45 volts is applied to the point 19 by the voltage source 17, a primary positive biasing voltage of 45 volts is applied to the terminal 24 by the voltage source 25 and a tertiary positive biasing voltage of 20 volts is applied to the point 32 by the voltage source 30. A periodically occurring positive pulse secondary biasing voltage of, for example, 10 volts, is applied to the terminal 11 by the positive shift pulse source 13. A periodically occurring negative pulse secondary biasing voltage of, for example, 10 volts, is applied to the terminal 24 by the negative shift pulse source 26.

When the preceding binary stage 5 is On and supplies a 45 volt pulse to the input terminal 1, the capacitor 15 is charged at 25 volts, due to the fact that the voltage source 12 applies 20 volts to the terminal 11 between two successive pulses of the secondary biasing voltage. During the shift function, when the pulse source 13 applies a 10 volt positive pulse secondary biasing voltage to the terminal 11, a positive voltage of 30 volts, which is the algebraic resultant sum of the primary and secondary biasing voltages, is applied to said terminal.

The 45 volts applied to the point 16 from the preceding binary stage 5 is increased to 55 volts during the shift function when the pulse source 13 applies a 10 volt positive shift pulse secondary biasing voltage to the terminal 11. Thus, between successive pulses of the secondary biasing voltage, the bias voltage at points 16 and 19 is 45 volts so that the first circuit branch 3 does not conduct current. During the shift function, however, during the application of a secondary biasing positive voltage pulse, the bias voltage at the point 16 is 55 volts and the bias voltage at the point 19 is initially 45 volts so that the first circuit branch 3 conducts current and a positive output pulse is fed from the output terminal 2 to the succeeding binary stage 6.

The 45 volts applied to the point 29 from the preceding binary stage 5 is decreased to 35 volts during the shift function when the pulse source 26 applies a 10 volt negative shift pulse secondary biasing voltage to the terminal 24. Thus, between successive pulses of the secondary biasing voltage, the bias voltage at the point 29 is 45 volts and the bias voltage at the point 32 is 20 volts so that the second circuit branch 4 does not conduct current. During the shift function, when a secondary biasing negative voltage pulse is applied to the terminal 24, the bias voltage at the point 29 is 35 volts and the bias voltage at the point 32 is 20 volts so that the second circuit branch 4 does not conduct current.

When the preceding binary stage 5 is Off and supplies a 20 volt pulse to the input terminal 1, the capacitor 28 is charged at 25 volts, due to the fact that the voltage source 25 applies 45 volts to the terminal 24 between two successive pulses of the secondary biasing voltage. During the shift function, when the pulse source 26 applies a 10 volt negative pulse secondary biasing voltage to the terminal 24, a positive voltage of 35 volts, which is the algebraic resultant sum of the primary and secondary biasing voltages, is applied to said terminal.

The 20 volts applied to the point 29 from the preceding binary stage 5 is decreased to 10 volts during the shift function when the pulse source 26 applies a 10 volt negative shift pulse secondary biasing voltage to the terminal 24. Thus, between successive pulses of the secondary biasing voltage, the bias voltage at points 29 and 32 is 20 volts so that the second circuit branch does not conduct current. During the shift function, however, during the application of a secondary biasing negative voltage pulse, the bias voltage at the point 29 is 10 volts and the bias voltage at the point 32 is initially 20 volts so that the second circuit branch 4 conducts current and a negative output pulse is fed from the output terminal 2 to the succeeding binary stage 6.

The 20 volts applied to the point 16 from the preceding binary stage 5 is increased to 30 volts during the shift function when the pulse source 13 applies the 10 volt positive shift pulse secondary biasing voltage to the terminal 11. Thus, between successive pulses of the secondary biasing voltage, the bias voltage at the point 16 is 20 volts and the bias voltage at the point 19 is 45 volts so that the first circuit branch 3 does not conduct current. During the shift function, when a secondary biasing positive voltage pulse is applied to the terminal 11, the bias voltage at the point 16 is 30 volts and the bias voltage at the point 19 is 45 volts so that the first circuit branch 3 does not conduct current.

The voltage in (volts) present at various points in the circuit arrangement of the present invention when the first and second levels of magnitude of the input voltage are assumed to be 45 and 20 volts, respectively, may be tabulated as follows:

*45 Volt Input Pulse Applied to Terminal 1*

| Point | Between Successive Secondary Biasing Voltage Pulses | During the Application of a Secondary Biasing Voltage Pulse (During Shift Function) |
|---|---|---|
| 1 | 45 | From 20 to 45. |
| 16 | 45 | 55.[1] |
| 11 | 20 | 30. |
| 19 | 45 | From an initial value of 45 to 55. |
| 29 | 45 | 35. |
| 24 | 45 | 35. |
| 32 | 20 | 20. |

*20 Volt Input Pulse Applied to Terminal 1*

| Point | Between Successive Secondary Biasing Voltage Pulses | During the Application of a Secondary Biasing Voltage Pulse (During Shift Function) |
|---|---|---|
| 1 | 20 | From 20 to 45. |
| 16 | 20 | 30. |
| 11 | 20 | 30. |
| 19 | 45 | 45. |
| 29 | 20 | 10.[2] |
| 24 | 45 | 35. |
| 32 | 20 | From an initial value of 20 to 10. |

[1] Positive pulse at output terminal 2.
[2] Negative pulse at output terminal 2.

The first and second RC circuits 14, 15 and 27, 28 perform a separating, or time delay, function whereby a change of state of the preceding binary stage 5 from On to Off or from Off to On does not influence the polarity of the output pulse fed to the succeeding binary stage 6.

The first and second auxiliary unidirectionally conducting elements 8 and 21 prevent the output pulse at the output terminal 2 from being affected by intermediate voltage changes at the input terminal 1. In other words, the elements 8 and 21 provide a separation between the input terminal 1 and the circuit during the shift function.

While the invention has been described by means of a specific example and in a specific embodiment, I do not wish to be limited thereto, for obvious modifications will occur to those skilled in the art without departing from the spirit and scope of the invention.

What I claim is:

1. A circuit arrangement comprising an input terminal, means for applying an input voltage to said input terminal, said input voltage having one of first and second substantially different levels of magnitude, an output terminal, a first circuit branch coupling said input and output terminals and comprising a first unidirectionally conducting element connected to conduct current in a positive direction from said input terminal to said output terminal and means for biasing said first unidirectionally conducting element to a normally non-conducting condition, said biasing means including a source of positive shift pulses and means for combining said input voltage and said positive shift pulses to form a combination voltage and applying said combination voltage to said first unidirectionally conducting element in a manner whereby the said first unidirectionally conducting element is biased to a conducting condition upon the simultaneous occurrence of an input voltage having said first level of magnitude and a positive shift pulse thereby to produce a positive pulse output voltage, said biasing means maintaining said first unidirectionally conducting element in a substantially non-conducting condition upon the occurrence of an input voltage having said second level of magnitude, and a second circuit branch coupling said input and output terminals in parallel relation to said first circuit branch and comprising a second unidirectionally conducting element connected to conduct current in a negative direction from said input terminal to said output terminal and means for biasing said second unidirectionally conducting element to a normally non-conducting condition, said last-mentioned biasing means including a source of negative shift pulses and means for combining said input voltage and said negative shift pulses to form a combination voltage and applying said combination voltage to said second unidirectionally conducting element in a manner whereby the said second unidirectionally conducting element is biased to a conducting condition upon the simultaneous occurrence of an input voltage having said second level of magnitude and a negative shift pulse thereby to produce a negative pulse output voltage, said last-mentioned biasing means maintaining said second unidirectionally conducting element in a substantially non-conducting condition upon the occurrence of an input voltage having said first level of magnitude.

2. A circuit arrangement comprising an input terminal, means for applying an input voltage to said input terminal, said input voltage having one of first and second substantially different levels of magnitude, an output terminal, a first circuit branch coupling said input and output terminals and comprising a first unidirectionally conducting element connected to conduct current in a positive direction from said input terminal to said output terminal and means for biasing said first unidirectionally conducting element, said biasing means comprising a primary biasing voltage, said primary biasing voltage having a substantially constant positive magnitude, a secondary biasing voltage, said secondary biasing voltage comprising a periodically occurring positive shift pulse, means for algebraically adding said primary and secondary biasing voltages to form a first resultant biasing voltage, means for applying said first resultant biasing voltage to an electrode of said first unidirectionally conducting element, a tertiary biasing voltage, said tertiary biasing voltage having a substantially constant positive magnitude, and means for applying said tertiary biasing voltage to another electrode of said first unidirectionally conducting element, said biasing voltages having magnitudes selected to bias said first unidirectionally conducting element to a conducting condition upon the simultaneous occurrence of an input voltage having said first level of magnitude and a positive shift pulse thereby to produce a positive pulse output voltage, said biasing voltage magnitudes being sufficient to maintain said first unidirectionally conducting element in a substantially non-conducting condition upon the occurrence of an input voltage having said second level of magnitude, and a second circuit branch coupling said input and output terminals in parallel relation to said first circuit branch and comprising a second unidirectionally conducting element connected to conduct current in a negative direction from said input terminal to said output terminal and means for biasing said second unidirectionally conducting element, said last-mentioned biasing means comprising a primary biasing voltage, said last-mentioned primary biasing voltage having a substantially constant positive magnitude, a secondary biasing voltage, said last-mentioned secondary biasing voltage comprising a periodically occurring negative shift pulse, means for algebraically adding said last-mentioned primary and secondary biasing voltages to form a second resultant biasing voltage, means for applying said second resultant biasing voltage to an electrode of said second unidirectionally conducting element, a tertiary biasing voltage, said last-mentioned tertiary biasing voltage having a substantially constant positive magnitude, and means for applying said last-mentioned tertiary biasing voltage to another electrode of said second unidirectionally conducting element, said last-mentioned biasing voltages having magnitudes selected to bias said second unidirectionally conducting element to a conducting condition upon the simultaneous occurrence of an input voltage having said second level of magnitude and a negative shift pulse thereby to produce a negative output voltage, said last-mentioned biasing voltage magnitudes being sufficient to maintain said second unidirectionally conducting element in a substantially non-conducting condition upon the occurrence of an input voltage having said first level of magnitude.

3. A circuit arrangement comprising an input terminal, means for applying an input voltage to said input terminal, said input voltage having one of first and second substantially different levels of magnitude, an output terminal, a first circuit branch coupling said input and output terminals and comprising a first unidirectionally conducting element connected to conduct current in a positive direction from said input terminal to said output terminal and means for biasing said first unidirectionally conducting element, said biasing means comprising a primary biasing voltage, said primary biasing voltage having a substantially constant positive magnitude, a secondary biasing voltage, said secondary biasing voltage comprising a periodically occurring positive shift pulse, means for algebracially adding said primary and secondary biasing voltages to form a first resultant biasing voltage, means for applying said first resultant biasing voltage to an electrode of said first unidirectionally conducting element, said last-mentioned means comprising a first resistance-capacitance circuit, a tertiary biasing voltage, said tertiary biasing voltage having a substantially constant positive magnitude, and means for applying said tertiary biasing voltage to another electrode of said first unidirectionally conducting element, said biasing voltages having magnitudes selected to bias said first unidirectionally conducting condition upon the simultaneous occurrence of an input voltage having said first level of magnitude and a positive shift pulse thereby to produce a positive pulse output voltage, said biasing voltage magnitudes being sufficient to maintain said first unidirectionally conducting element in a substantially non-conducting condition upon the occurrence of an input voltage having said second level of magnitude, and a second circuit branch coupling said input and output terminals in parallel relation to said first circuit branch and comprising a second unidirectionally conducting element connected to conduct current in a negative direction from said input terminal to said output terminal and means for biasing said second unidirectionally conducting element, said last-mentioned biasing means comprising a primary biasing voltage, said last-mentioned primary biasing voltage having a substantially constant positive magnitude, a secondary biasing voltage, said last-mentioned secondary biasing voltage comprising a periodically occurring negative shift pulse, means for algebraically adding said last-mentioned primary and secondary biasing voltages to form a second resultant biasing voltage, means for applying said second resultant biasing voltage to an electrode of said second unidirectionally conducting element, said last-mentioned means comprising a second resistance-capacitance circuit, a tertiary biasing voltage, said last-mentioned tertiary biasing voltage having a substantially constant positive magnitude, and means for applying said last-mentioned tertiary biasing voltage to another electrode of said second unidirectionally conducting element, said last-mentioned biasing voltages having magnitudes selected to bias said second unidirectionally conducting element to a conducting condition upon the simultaneous occurrence of an input voltage having said second level of magnitude and a negative shift pulse thereby to produce a negative output voltage, said last-mentioned biasing voltage magnitudes being sufficient to maintain said second unidirectionally conducting element in a substantially non-conducting condition upon the occurrence of an input voltage having said first level of magnitude.

4. A circuit arrangement comprising an input terminal, means for applying an input voltage to said input terminal, said input voltage having one of first and second substantially different levels of magnitude, an output terminal, a first circuit branch coupling said input and output terminals and comprising a first unidirectionally conducting element connected to conduct current in a positive direction from said input terminal to said output terminal, a first auxiliary unidirectionally conducting element connected between said input terminal and said first unidirectionally conducting element, said first auxiliary unidirectionally conducting element being connected to conduct in the same direction as said first unidirectionally conducting element, and means for biasing said first unidirectionally conducting element, said biasing means comprising a primary biasing voltage, said primary biasing voltage having a substantially constant positive magnitude, a secondary biasing voltage, said secondary biasing voltage comprising a periodically occurring positive shift pulse, means for algebracially adding said primary and secondary biasing voltages to form a first resultant biasing voltage, means for applying said first resultant biasing voltage to an electrode of said first unidirectionally conducting element, said last-mentioned means comprising a first resistance-capacitance circuit, a tertiary biasing voltage, said tertiary biasing voltage having a substantially constant positive magnitude, and means for applying said tertiary biasing voltage to another electrode of said first unidirectionally conducting element, said biasing voltages having magnitudes selected to bias said first unidirectionally conducting element to a conducting condition upon the simultaneous occurrence of an input voltage having said first level of magnitude and a positive shift pulse thereby to produce a positive pulse output voltage, said biasing voltage magnitudes being sufficient to maintain said first unidirectionally conducting element in a substantially non-conducting condition upon the occurrence of an input voltage having said second level of magnitude, and a second circuit branch coupling said input and output terminals in parallel relation to said first circuit branch and comprising a second unidirectionally conducting element connected to conduct current in a negative direction from said input terminal to said output terminal, a second auxiliary unidirectionally conducting element connected between said input terminal and said second unidirectionally conducting element, said second auxiliary unidirectionally conducting element being connected to conduct in the same direction as said second unidirectionally conducting element, and means for biasing said second unidirectionally conducting element, said last-mentioned biasing means comprising a primary biasing voltage, said last-mentioned primary biasing voltage having a substantially constant positive magnitude, a secondary biasing voltage, said last-mentioned secondary biasing voltage comprising a periodically occurring negative shift pulse, means for algebraically adding said last-mentioned primary and secondary biasing voltages to form a second resultant biasing voltage, means for applying said second resultant biasing voltage to an electrode of said second unidirectionally conducting element, said last-mentioned means comprising a second resistance-capacitance circuit, a tertiary biasing voltage, said last-mentioned tertiary biasing voltage having a substantially constant positive magnitude, and means for applying said last-mentioned tertiary biasing voltage to another electrode of said second unidirectionally conducting element, said last-mentioned biasing voltages having magnitudes selected to bias said second unidirectionally conducting element to a conducting condition upon the simultaneous occurrence of an input voltage having said second level of magnitude and a negative shift pulse thereby to produce a negative output voltage, said last-mentioned biasing voltage magnitudes being sufficient to maintain said second unidirectionally conducting element in a substantially non-conducting condition upon the occurrence of an input voltage having said first level of magnitude.

5. A circuit arrangement comprising an input terminal, means for applying an input voltage to said input terminal, said input voltage having one of first and second substantially different levels of magnitude, an output terminal, a first circuit branch coupling said input and output terminals and comprising a first unidirectionally conducting element connected to conduct curret in a positive direction from said input terminal to said output terminal, a first auxiliary unidirectionally conducting element connected between said input terminal and said first unidirectionally conducting element, said first auxiliary unidirectionally conducting element being connected to conduct in the same direction as said first unidirectionally conducting element, and means for biasing said first unidirectionally conducting element, said biasing means comprising a primary biasing voltage, said primary biasing voltage having a substantially constant positive magnitude, a secondary biasing voltage, said secondary biasing voltage comprising a periodically occurring positive shift pulse, means for algebraically adding said primary and secondary biasing voltages to form a first resultant biasing voltage, means for applying said first resultant biasing voltage to an electrode of said first unidirectionally conducting element, said last-mentioned means comprising a first resistance-capacitance circuit, a tertiary biasing voltage, said tertiary biasing voltage having a substantially constant positive magnitude, and means for applying said tertiary biasing voltage to another electrode of said first unidirectionally conducting element, said biasing voltages having magnitudes selected to bias said first unidirectionally conducting element to a conducting condition upon the simultaneous occurrence of an input voltage having said first level of magnitude and a positive shift pulse thereby to produce a positive pulse output voltage, said biasing voltage magnitudes being sufficient to maintain said first unidirectionally conducting element in a substantially non-conducting condition upon the occurrence of an input voltage having said second level of magnitude and to maintain said first unidirectionally conducting element in a substantially non-conducting condition upon the non-occurrence of said positive shift pulse, and a second circuit branch coupling said input and output terminals in parallel relation to said first circuit branch and comprising a second unidirectionally conducting element connected to conduct current in a negative direction from said input terminal to said output terminal, a second auxiliary unidirectionally conducting element connected between said input terminal and said second unidirectionally conducting element, said second auxiliary unidirectionally conducting element being connected to conduct in the same direction as said second unidirectionally conducting element, and means for biasing said second unidirectionally conducting element, said last-mentioned biasing means comprising a primary biasing voltage, said last-mentioned primary biasing voltage having a substantially constant positive magnitude, a secondary biasing voltage, said last-mentioned secondary biasing voltage comprising a periodically occurring negative shift pulse, means for algebraically adding said last-mentioned primary and secondary biasing voltages to form a second resultant biasing voltage, means for applying said second resultant biasing voltage to an electrode of said second unidirectionally conducting element, said last-mentioned means comprising a second resistance-capacitance circuit, a tertiary biasing voltage, said last-mentioned tertiary biasing voltage having a substantially constant positive magnitude, and means for applying said last-mentioned tertiary biasing voltage to another electrode of said second unidirectionally conducting element, said last-mentioned biasing voltages having magnitudes selected to bias said second unidirectionally conducting element to a conducting condition upon the simultaneous occurrence of an input voltage having said second level of magnitude and a negative shift pulse thereby to produce a negative output voltage, said last-mentioned biasing voltage magnitudes being sufficient to maintain said second unidirectionally conducting element in a substantially non-conducting condition upon the occurrence of an input voltage having said first level of magnitude and to maintain said second unidirectionally conducting element in a substantially non-conducting condition upon the non-occurrence of said negative shift pulse.

6. A circuit arrangement comprising an input terminal, means for applying an input voltage to said input terminal, said input voltage having one of first and second substantially different levels of magnitude, an output terminal, a first circuit branch coupling said input and output terminals and comprising a first unidirectionally conducting element connected to conduct current in a positive direction from said input terminal to said output terminal and means for biasing said first unidirectionally conducting element, said biasing means comprising a primary biasing voltage, said primary biasing voltage having a substantially constant positive magnitude and being substantially equal to said second level of magnitude, a secondary biasing voltage, said secondary biasing voltage comprising a periodically occurring positive shift pulse, means for algebraically adding said primary and secondary biasing voltages to form a first resultant biasing voltage, means for applying said first resultant biasing voltage to an electrode of said first unidirectionally conducting element, a tertiary biasing voltage, said tertiary biasing voltage having a substantially constant positive magnitude and being substantially equal to said first level of magnitude, and means for applying said tertiary biasing voltage to another electrode of said first unidirectionally conducting element, said biasing voltages having magnitudes selected to bias said first unidirectionally conducting element to a conducting conditon upon the simultaneous occurrence of an input voltage having said first level of magnitude and a positive shift pulse thereby to produce a positive pulse output voltage, said biasing voltage magnitudes being sufficient to maintain said first unidirectionally conducting element in a substantially non-conducting condition upon the occurrence of an input voltage having said second level of magnitude, and a second circuit branch coupling said input and output terminals in parallel relation to said first circuit branch and comprising a second unidirectionally conducting element connected to conduct current in a negative direction from said input terminal to said output terminal and means for biasing said second unidirectionally conducting element, said last-mentioned biasing means comprising a primary biasing voltage, said last-mentioned primary biasing voltage having a substantially constant positive magnitude and being substantially equal to said first level of magnitude, a secondary biasing voltage, said last-mentioned secondary biasing voltage comprising a periodically occurring negative shift pulse, means for algebraically adding said last-mentioned primary and secondary biasing voltages to form a second resultant biasing voltage, means for applying said second resultant biasing voltage to an electrode of said second unidirectionally conducting element, a tertiary biasing voltage, said last-mentioned tertiary biasing voltage having a substantially constant magnitude and being substantially equal to said second level of magnitude, and means for applying said last-mentioned tertiary biasing voltage to another electrode of said second unidirectionally conducting element, said last-mentioned biasing voltages having magnitudes selected to bias said second unidirectionally conducting element to a conducting condition upon the simultaneous occurrence of an input voltage having said second level of magnitude and a negative shift pulse thereby to produce a negative output voltage, said last-mentioned biasing voltage magnitudes being sufficient to maintain said second unidirectionally conducting element in a substantially non-conducting condition upon the occurrence of an input voltage having said first level of magnitude.

References Cited in the file of this patent

UNITED STATES PATENTS

| | | |
|---|---|---|
| 2,580,771 | Harper | Jan. 1, 1952 |
| 2,720,642 | Blakely | Oct. 11, 1955 |
| 2,721,947 | Isborn | Oct. 25, 1955 |
| 2,730,632 | Curtis | Jan. 10, 1956 |
| 2,798,983 | Warman | July 9, 1957 |
| 2,817,772 | Lee | Dec. 24, 1957 |